2,857,348

VINYL HALIDE RESINS PLASTICIZED WITH DI-ACETO-OLEIN AND PHOSPHORIC ACID ESTERS

Frank C. Magne, Evald L. Skau, and Reuben O. Feuge, New Orleans, La., assignors to the United States of America as represented by the Secretary of Agriculture No Drawing. Application May 27, 1954
Serial No. 432,948

2 Claims. (Cl. 260—23)

(Granted under Title 35, U. S. Code (1952), sec. 266)

A non-exclusive, irrevocable, royalty-free license in the invention herein described, throughout the world for all purposes of United States Government, with the power to grant sublicenses for such purposes, is hereby granted to the Government of the United States of America.

This invention relates to plasticized vinyl resins, and has among its objects the provision of vinyl resins predominating in polymerized vinyl chloride plasticized with plasticizers which improve the low temperature brittle point, tensile strength, modulus of elasticity, and the like properties, of the resins, and reduce the combustibility of the resins.

Vinyl resins, particularly those employing vinyl chloride polymers, are generally mixed with a plasticizer to improve the properties of stiffness, brittleness, etc. Most of the vinyl resins are somewhat combustible. In numerous uses, it is desirable to plasticize the vinyl resins with a plasticizer capable of reducing their tendency to burn. One example is the use of the vinyl resin as a bonding agent for glass or quartz laminates.

The liquid non-volatile neutral esters of phosphoric acid are an important class of combustibility-reducing plasticizers. Such plasticizers include triethyl, tributyl, tri(2-ethylhexyl), tributyl oxyethyl, triphenyl, cresyl diphenyl, tricresyl, tri-dimethylphenyl, 2-ethylhexyl diphenyl alkaryl, diphenyl mono-ortho-xenyl, and tri-para-tertiary-butylphenyl phosphate.

We have discovered that by blending one part of at least one of the non-volatile liquid neutral esters of phosphoric acid with from about ¼ to 4 parts of certain mixed triglycerides a composite plasticizer is produced in which the capability of the phosphorus ester plasticizer to lower the brittle point and the modulus of elasticity, to give a suitable tensile strength and elongation and to otherwise improve the properties of the vinyl resins, is substantially unaltered, or is enhanced without a loss of the capability of the plasticizer to reduce the combustibility of the resin.

The term "parts" is used throughout the specification and claims to refer to parts by weight.

Preferred plasticized resins provided by this invention comprise vinyl chloride-vinyl acetate copolymers that predominate in polymerized vinyl chloride and contain from about 50 to 66 parts per hundred parts of resin of a plasticizer consisting of a mixture of from about ¼ to 1 part of at least one mixed triglyceride consisting essentially of a diacetyl ester of a glycerol monoester of oleic acid (hereinafter referred to as diaceto-oleins), per part of at least one non-volatile liquid neutral ester of phosphoric acid.

The triglyceride used in the invention can be prepared by a variety of methods as, for example, by diesterifying a monoglyceride of oleic acid with acetic acid; by reacting oleic acid with glycerol until monoglycerides are produced and diesterifying the monoglycerides with acetic acid; or by interesterifying the triglyceride of oleic acid with the triglyceride of acetic acid until the interesterification products consist essentially of the desired triglyceride.

Other resin additives such as pigments, fillers, extenders, solvents and the like may be present in the compositions of this invention in the amounts ordinarily employed for the purposes indicated.

The following examples are illustrative of details of this invention.

A commercially available vinyl chloride-vinyl acetate copolymer predominating in polymerized vinyl chloride (Vinylite VYDR) was plasticized and evaluated by the following procedures. The plasticizers were added to the dry mixture of the other three components just before milling. This operation was performed on a 6 x 12-inch rubber mill at a temperature of 310° F. The sheeted resin was then molded in a standard 6 x 6 x 0.075-inch four-cavity mold. Since the sheeted resin was too thin to fill the mold completely several layers usually four, were placed in each mold with the milling axes parallel. The molds were gradually pressured, over a 10-minute period, to a maximum pressure of 500 p. s. i. and then held for an additional 10 minutes at the molding temperature, 310° F. The pressure was not released until the molds were cold.

Dumbbell specimens for the determinations of tensile strength, 100% modulus, and ultimate elongation were die-cut (ASTM D412–41) from the molded sheets parallel to the milling axis. The measurements were made on an IP–4 Scott tester at a loading rate of 200 lbs. per minute at 70° F. and 65± 2% R. H., the specimen having first been equilibrated to these conditions for 24 hours.

The brittle points were determined on specimens die-cut from the molded sheets following the procedure given in ASTM test D746–44T.

Three commercially available plasticizers, dioctyl phthalate, tricresyl phosphate and cresyl diphenyl phosphate, which are hereafter referred to by their initials, DOP, TCP, and CDPP, were compared with two composite plasticizers including the diaceto-olein of this invention. Of the composite plasticizers: "composite A" consisted of TCP mixed with an equal part of a mixed triglyceride consisting essentially of unsymmetrical diaceto-stearin; "composite B" consisted of 4 parts of TCP mixed with 1 part of a mixed triglyceride consisting essentially of diaceto-stearin; "composite C" consisted of CDPP mixed with an equal part of a mixed triglyceride consisting essentially of unsymmetrical diaceto-olein; and "composite D" consisted of 3 parts of CDPP mixed with 1 part of a mixed triglyceride consisting essentially of unsymmetrical diaceto-olein. In each case 54 parts of plasticizer was used per 100 parts of resin.

The results of the comparison are indicated in the following table:

| Plasticizers | Brittle Point, °C. | Tensile Strength, p. s. i. | 100% Modulus, p. s. i. | Elongation, Percent |
|---|---|---|---|---|
| Composite A | −16 | 3,200 | 1,650 | 300 |
| Composite B | −10 | 3,528 | 2,041 | 270 |
| TCP | 0 | 3,600 | 2,400 | 280 |
| Composite C | −40 | 2,980 | 1,422 | 300 |
| Composite D | −36 | 3,009 | 1,434 | 310 |
| CDPP | −34 | 3,020 | 1,400 | 290 |
| DOP | −33 | 3,000 | 1,550 | 330 |

The combustibility of the resins plasticized with TCP, CDPP, DOP, composite A, and composite C were compared by igniting strips. The strips used had the same size and shape, were held at the same angle in the flame of a bunsen burner, and were removed from the flame as soon as they were ignited. While the resins plasticized with either the phosphate ester or the composite plasticizers immediately extinguished themselves when they were removed from the flame, the resins plasticized with DOP continued to burn for several seconds.

We claim:
1. A vinyl chloride-vinyl acetate copolymer predominating in polymerized vinyl chloride containing from about 50 to 66 parts per hundred parts of resin of a plasticizer comprising a mixture of one part of a non-volatile liquid neutral ester of phosphoric acid mixed with from about ¼ to 1 part of a mixed triglyceride consisting essentially of diaceto-olein.
2. The copolymer of claim 1 in which the phosphate ester is cresyl diphenyl phosphate.

References Cited in the file of this patent
UNITED STATES PATENTS

| | | |
|---|---|---|
| 1,558,299 | Schwartz | Oct. 20, 1925 |
| 2,091,988 | Hubbuch et al. | Sept. 7, 1937 |
| 2,381,888 | Arge | Aug. 14, 1945 |
| 2,764,605 | Embree et al. | Sept. 25, 1956 |
| 2,779,743 | Schwencke | Jan. 29, 1957 |

OTHER REFERENCES

Journal of the American Oil Chemists' Society, vol. 30, No. 7, pp. 269–271, July 1953.